Feb. 7, 1967  A. B. JONES  3,303,510
WATER LEVEL DIRECTION INDICATOR
Filed Jan. 26, 1965  3 Sheets-Sheet 1

INVENTOR
ALLEN B. JONES
BY Ernest S. Cohen
Gersten Sadowsky
ATTORNEYS

United States Patent Office 3,303,510
Patented Feb. 7, 1967

3,303,510
WATER LEVEL DIRECTION INDICATOR
Allen B. Jones, 804 Maple St., Oakdale, La. 71463
Filed Jan. 26, 1965, Ser. No. 428,274
2 Claims. (Cl. 346—49)

The invention herein described and claimed may be manufactured and used by or for the Government of the United States of America for governmental purposes without the payment of royalties thereon or therefor.

The present invention relates to improvements in an apparatus for recording a variable movement, and more particularly the rise or fall of water levels detected in measuring water stages.

Now extensively used in conducting hydrological studies is a type of water stage recorder which comprises a strip chart record sheet driven to move relative to a stylograph or recorder pen whose displacement across the chart places a graphical curve thereon which reflects the rise and fall of measured water levels. This record chart is fed from a supply roll of suitably designed graph paper, and steadily moved between a recording roller and take-up roller by a drive originating in a time-controlled actuating mechanism. The recorder pen is displaced along a straight line path between margins running parallel with the side edges of the record chart such that it produces the aforesaid curve as a continuous line thereon extending lengthwise thereof. The recorder pen is movable in either direction to follow the angular displacement of a shaft controlled by a float-actuated pulley system arranged to sense changes in a water level. Since a relatively narrow record chart is desirable to afford an economical construction for this type of recorder, a folded scale arrangement is normally employed thereon in which lines ostensibly directed to cross over a margin of the chart are oppositely redirected from such margin. Accordingly, the recorder pen is also adapted to be controlled by a reversing mechanism which acts to switch the direction of the pen drive whenever the pen appears contiguous to an outer margin of the record chart. Because reversal of the pen drive is effected whether the pen is brought to a margin in response to a rising or a falling water level, lines on the chart having either positive or negative slopes may be representative of both rising and falling water levels. It is therefore evident that unless information is available to indicate whether a rising or falling level is represented by a line approaching a marginal area wherein a reversal thereof occurs, any meaningful interpretation of a record on a chart becomes extremely difficult.

Disclosures of water stage recorders of the type to which reference is made herein, are found in Patents Nos. 2,000,046 and 2,596,305, issued to J. C. Stevens on May 7, 1935, and May 13, 1952, respectively, and Patent No. 2,108,037, issued to C. H. Au on February 15, 1938. Au's patent is of particular interest since it describes a water stage recorder equipped with an auxiliary recorder pen which draws a continuous line along a margin of a strip chart to indicate those reversals in the heading of a primary recorder pen, moving across its chart, that are occasioned by the primary pen reaching an outer margin. Since a pen reversal due to the pen's proximity to a chart's margin can be distinguished from a pen reversal due solely to a reversal in the direction of water level change, it would appear that the latter may be easily identified on a chart made by Au's invention. However, a change in direction of water level movement or trend occurring when the primary pen is at or near either edge of the chart may be indicated merely as a reversal in the direction of the primary pen with the water level trend continuing in the same direction, when actually the water level trend has changed. Moreover, a proper interpretation of a strip chart produced in accordance with the teaching of the Au patent necessitates the remembrance of the initial and subsequent directional significance of the primary record line as it is followed through all the various reversals thereof brought about by the pen's close approaches to a margin. Since an understandable reading of Au's chart must generally be dependent upon the mental agility of the reader, the routine utilization of such charts can be time consuming and possibility subject to errors. The present invention overcomes the evident drawbacks of the prior art by producing a water-level record chart having all the information needed to allow a rapid and accurate determination of the water stage. Its auxiliary pen draws a continuous line which is easily read together with the primary record line to make fully and clearly apparent all pen movement reversals due to the pen reaching a marginal area, whether or not contemporaneously therewith the direction of a rising or falling water level was reversing.

An object of the present invention is therefore to provide a means producing a record of a varying physical phenomenon having primary and keying traces which together unqualifiedly indicate the magnitudes of the phenomenon's variations and changes in direction such phenomenon may take.

A further object of the invention is to provide a phenomenon sensing recorder apparatus with an auxiliary recording stylus which automatically reciprocates in response to the detection of a predetermined characteristic of the phenomenon.

These and other objects of the invention will more fully appear from the following detailed description when read in connection with the accompanying drawing wherein.

Figure 1:
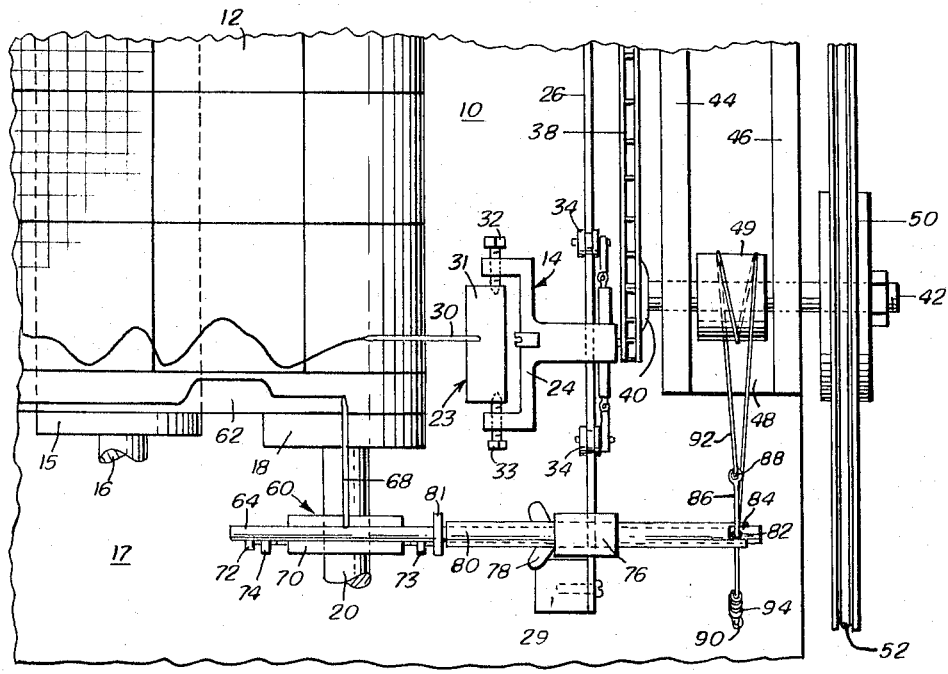
FIG. 1 is a plan view of a partial showing of a water stage recorder comprising the improvement of the present invention.
Figure 2:
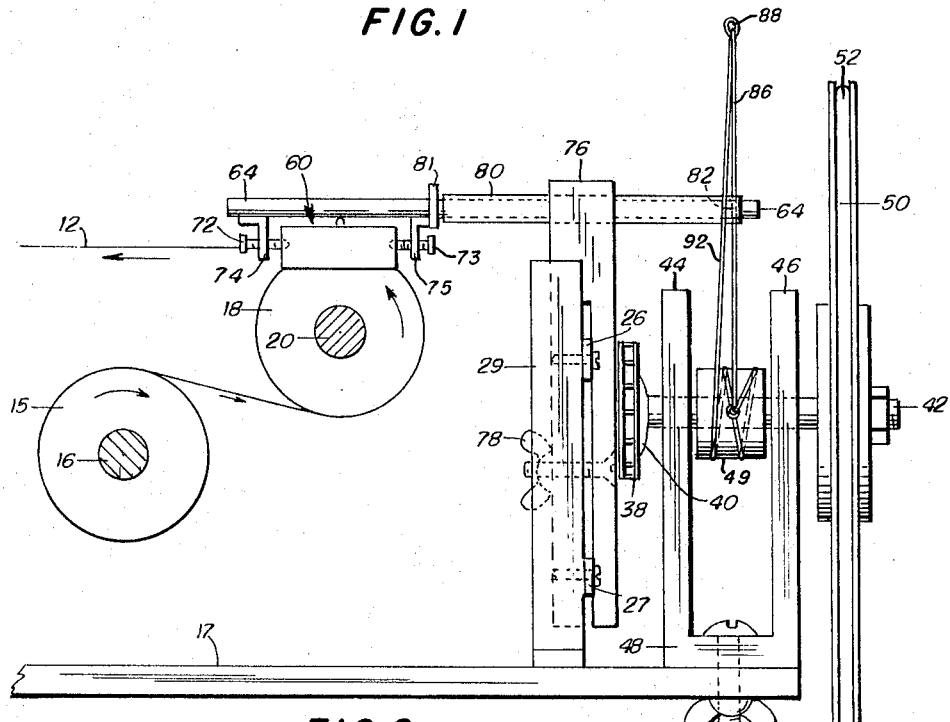
FIG. 2 is an end elevational view of a part of the showing in FIG. 1.

Referring to FIGS. 1 and 2, a typical recording arrangement 10 in a water level recorder apparatus can be seen to comprise a movable strip of sectioned material, constituting a graphical record chart 12, operatively associated with a recorder pen structure 14. Chart 12 is supplied to run past pen structure 14, from a roll of record material 15 maintained on a roller 16 removably mounted in suitable bearings (not shown) supported within the housing structure 17 of the apparatus. As is more fully explained in Stevens' Patent No. 2,000,046, chart 12, which has perforations along the length of one edge thereof, passes up from below to wrap around a recording durm 18, so as to engage spines on the drum corresponding to the perforations, and extends to the left as illustrated in FIGS. 1 and 2, into a connection therefor on a take-up roller (not shown). Drum 18 is fixed to a shaft 20 and is rotatable therewith in response to a drive from a time controlled actuating mechanism, as was previously indicated. A spring belt which passes around pulleys of different diameters fixed to the shaft supporting the take-up roller and to shaft 20, respectively, is provided to allow rotation of the take-up roller at increased speeds, and slippage of the belt on the pulley, in order that chart 12 will always be kept taut, yet avoid excessive strain or tearing.

Figure 3:
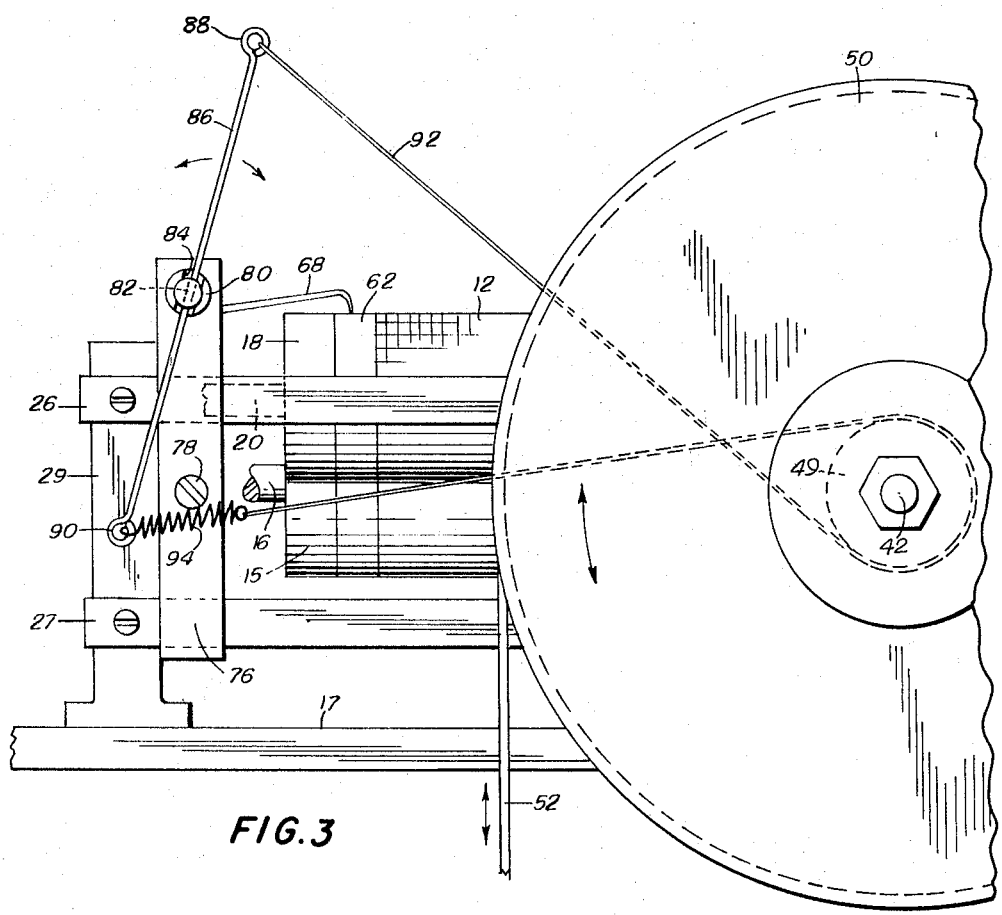
FIG. 3 is a side elevational view of a part of the showing in FIG. 1.

Recorder pen structure 14 can be seen in FIGS. 1 and 3 to include a stylograph device 23 pivotally attached to a displaceable carriage 24. Provisions to operatively support carriage 24 include spaced apart parallel tracks or guide rails 26 and 27, attached to supporting uprights 29, one of which is shown in the figures. Comprising stylograph 23 are a writing element 30 which extends from a refillable ink reservoir 31, mounted to pivot in respect to carriage 24 on a pair of adjustable pivot screws 32 and 33. Writing element 30 and reservoir 31 are mounted off center so that their weight will cause the point of element 30 to rest upon chart 12 as it traverses the upper surface of drum 18. Carriage 24 comprises a plurality of flanged wheels 34, which engage the upper and lower edges, respectively, of the upper and lower guide rails 26 and 27. The guide rails are mounted in structure 17 parallel to the axis of drum 18 whereby pen structure 14 is constrained to move in either direction along a straight line path aligned across approximately the full width of chart 12. Carriage 24 is suitably connected, as hereinafter explained, to move with an endless sprocket chain 38, which passes about a driving sprocket 40, and a spring tensioned idler sprocket (not shown). Provisions made to reverse the direction in which carriage 24 is traveling to reach one or the other ends of its span of travel, includes a generally diamond shaped cam track on a body part of carriage 24, and a pin extending from sprocket 40 which moves in this track and acts therein to change the direction in which sprocket 40 draws the carriage therewith, all in a manner more fully described in the aforementioned Stevens Patent No. 2,000,046. This driving linkage is thusly operable to displace carriage 24 toward either end of guide rails 26 and 27, whereby different predetermined movements of the carriage transversely with respect to the direction of movement of chart 12, are facilitated.

Driving sprocket 40 is fixed to one end of a shaft 42 which is rotatable in aligned bearings arranged in the opposite vertical walls of a channel member 48, clamped to the base of housing structure 17. On a portion of shaft 42, situated between the vertical walls of member 48, is fixed a cylindrical sleeve 49 whose rotation with the shaft provides a controlling drive to a further recording structure 60, to be hereinafter more fully explained. Securely fastened to the other end of shaft 42, extending outside the housing, is a sheave 50 provided with a groove having spaced sockets therein for reception of a cable 52 furnished with spaced antislipping beads 54, each of which is receivable in one of the sockets in the sheave. By means of this construction, carriage 24 is caused to move in exact relation to the movement of cable 52, as the latter is shifted up or down by a movable member, connected thereto, for sensing a variable condition. The sensing member may be a float, resting on the surface of water in a well openly communicating with a variable stream, which functions in conjunction with a suitable counterweight, in a manner more fully described in the aforementioned patents to Stevens.

Also operatively associated with chart 12 is the aforementioned further recording structure 60, which in the present invention functions to produce on the normally blank surface 62 along one edge of the chart, a record of the directional changes in the water level variations. Structure 60 is attached to a shaft 64, and angularly displaceable therewith in response to the sensing of the aforesaid directional changes. Comprising structure 60 is a stylograph having a conventional writing element 68 and refillable ink reservoir 70. A set of pivot screws 72 and 73, supported in spaced apart hanger brackets 74 and 75, respectively, fixed to the surface of shaft 64, near one end thereof, provide off-centered pivot point connections to reservoir 70. This pivotal connection allows a short oscillation of the writing point of element 68 across chart surface 62 when shaft 64 is displaced as indicated. A slotted member 76, shown in FIG. 2 straddling guide rails 26 and 27, is provided to support shaft 64 parallel to the float controlled shaft 42, and suitably situate shaft 64 so as to adapt writing structure 60, attached thereto, for producing the aforementioned record of directional displacement on chart surface 62. A screw and wing nut fastening 78 passing through openings in extended lower portions of support member 76, and between the guide rails, is provided to securely attach the member to the place on the guide rails which properly locates shaft 64 as indicated.

A suitable hole through the head portion of support member 76 provides a passage receiving, for rotation therein, a bearing tube 80 in which is securely fitted shaft 64. A washer 81 is also placed on shaft 64 to firmly hold tube 80 spaced from the edge of bracket 75. A diametrical hole 82 traversing shaft 64 near the end thereof opposite to that on which writing structure 60 is supported, opens into short slots 84 at the end of tube 80 contiguous to hole 82. Snugly fitted into hole 82, and through slots 84, is a relatively small diameter rigid rod 86 provided with eyelets 88 and 90 at the opposite ends thereof. A strong string 92, wound once around the cylindrical surface of sleeve 49, has one end thereof tied to eyelet 88, and the other end thereof tied to one end of a light spring 94 whose opposite end is in turn secured to eyelet 90 of the rod. As is evident from the showing in FIG. 3, spring 94 acts to maintain string 92 taut such that angular displacements of shaft 42 in either direction causes sleeve 49 to carry string 92 around therewith by reason of frictional contact between the parts. As a result, clockwise movement of shaft 42, as viewed in FIG. 3, pivots rod 86 counterclockwise about its bearing in member 76, and a counterclockwise movement of shaft 42 pivots rod 86 clockwise about its bearing. Since the disposition of writing structure 60 is such as to limit the displacement of writing element 64 to the short distance within the width of a marginal area of chart 12, any rotation of shaft 42, and sleeve 49 therewith, beyond that which accomplishes the aforesaid limited displacement, will merely give rise to slippage between string 92 and the sleeve.

Figure 4:
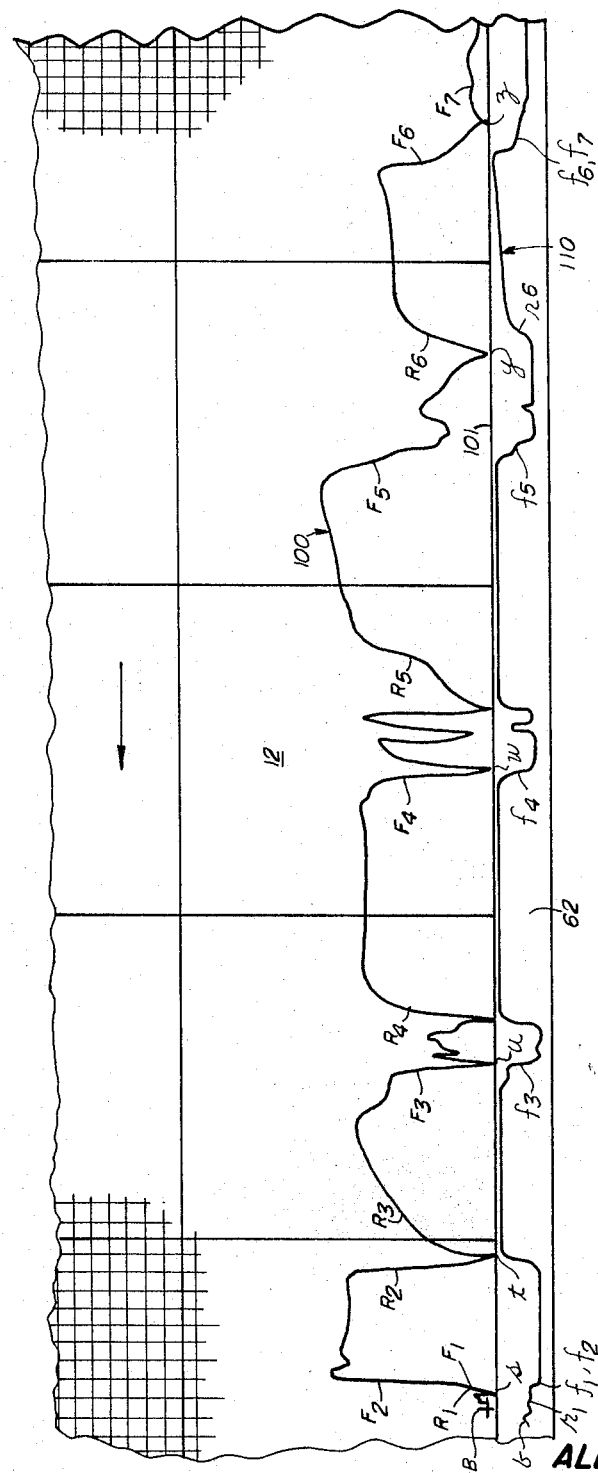
FIG. 4 shows a partial record chart made in the operation of a water stage recorder having the aforesaid improvement.

The important advantages of the present invention will appear more clearly from a consideration of FIG. 4 showing a partial length of a chart 12 on which a water-level indication record was produced by means of an apparatus according to the invention. Measurable on the abscissa and ordinate scales of this record are, respectively, time in hours or days, and changes in water-level, in feet. $Rn$ and $Fn$, shown referring to a principal record curve 100, are respectively rising and falling water level changes with respect to time as represented by the curve, and $rn$ and $fn$, shown referring to an auxiliary record curve 110, are respectively further indicators of the rising and falling character of the principal record curve 100. As indicated by the arrow in FIG. 4, chart 12 moves from right to left such that curves 100 and 110, starting at B and $b$, respectively, are read from left to right. Initially, curve 100 indicates a slight rise $R_1$ followed by a falling level $F_1$. At a marginal point $s$, pen structure 14 is reversed, and moves up from margin 101 to draw $F_2$ of curve 100. Concurrently with the operation of pen structure 14, an operation of pen structure 60 is effectuated wherein it is moved slightly upwardly from an initial intermediate position to draw $r$ of curve 110, and thereafter shifted downwardly to draw $f_1$, $f_2$ of the auxiliary curve. Line $f_1$, $f_2$ follows from a rising-to-falling shift in the water-level sensed by the drive to sheave 50, which changed the rotation of the sheave and the rotatable parts connected thereto, including shaft 42 and sleeve 49, from clockwise to counterclockwise. As a consequence, the motion transmitting train from sleeve 49 to pen structure 60, including string 92, rod 86, and shaft 64, was activated to swing pivoted part 70 clockwise, whereby writing element 68 thereon was shifted to draw the downward curve of line $f_1$, $f_2$ on the marginal area 62.

Reference to line $f_1$, $f_2$ can thus make readily evident that upwardly directed line $F_2$ of principal curve 100 indicates a falling water level. Similarly, reference to upwardly disposed indicator $r_1$, $r_2$ of auxiliary curve 110, quickly advises that oppositely directed lines $R_2$ and $R_3$ of curve 100 are both representative of a rising water level, and point $t$ at margin 101 merely reflects the reversal of carriage 24. Also manifest from an inspection of the curve 110 between lines $f_1$, $f_2$ and $r_2$, $r_3$, is the very slight rising-level character of the curve 100 between lines from $F_2$ and $R_2$. In the coordinated operation producing the curve 110 indicators of slight change from falling-to-rising levels and subsequent abrupt rise in level, sheave 50 shifted to a clockwise rotation whereby shaft 64 turned counterclockwise to shift writing element 68 upwardly along marginal area 62.

Upon further tracing curves 100 and 110 from left to right across chart 12, several other directional changes in water-level variations can be noted and are easily distinguishable from the indicated carriage reversals. For example, lines $f_3$, $f_4$, and $f_6$, $f_7$, of curve 110, conclusively show that the respective upwardly directed lines following immediately after downwardly directed falling level lines $F_3$, $F_4$ and $F_6$ of curve 100, are also indicative of falling levels, and that the abrupt deviations of curve 100 at points $u$, $w$ and $z$, denote only the effect of the automatic reversals given carriage 24 each time it passes through the end of its span of travel. On the other hand, it can also be easily ascertained that the marginal contact by curve 100 at point $y$ does not represent such a carriage reversal. This contact at point $y$ must represent nothing more than a reversal in the direction of the water level variations since curve 110 between lines $f_5$ and $r_6$ indicates a substantially continuing falling level up to point $y$, and immediately thereafter line $r_6$ indicates the continuing rising level represented by line $R_6$ on curve 100.

While a preferred embodiment of the invention has been illustrated and described, it is understood that the invention is not limited thereby, but is susceptible to change in form and detail.

What is claimed is:

1. In an apparatus for measuring and recording a changeable condition having a directional characteristic, a recorder comprising means for supporting a moving record sheet, a plurality of displaceable writing means operable to draw markings on said sheet, first and second mechanisms controlling displacement of a first of said plurality of writing means, said first control mechanism being operable to linearly displace said first writing means in either of two opposite directions within a first predetermined span of travel in respect to said sheet, and said second control mechanism being operable to reverse the travel direction of said first writing means at predetermined points in said span of travel, a third mechanism controlling displacement of a second of said plurality of writing means being operable to linearly displace said second writing means in either of two opposite directions within a different predetermined span of travel in respect to said sheet, said third displacement control mechanism comprising a rotatable means operable to effect said linear displacement of said second writing means, said first and second control mechanisms having displacement guide means operatively associated therewith providing a support for a bearing member adjustably secured to said guide means, said rotatable means being operatively maintained in said bearing member, means pivotably supporting said second writing means adjacent one end of said rotatable means, an actuatable means, operable in response to variations in said changeable condition, to drive said first displacement control mechanism in accordance with the relative magnitude and direction of said changeable condition, and said third displacement control mechanism in accordance with a generally partial relative magnitude and the direction of said changeable condition, said rotatable means having secured to an end opposite said one end thereof an impelling means comprising a lever and a flexible means fixed to said lever connecting the latter to said actuable drive means through frictional contact, whereby said flexible connecting means transmits a limited drive to said impelling means of said rotatable means.

2. In the apparatus for measuring and recording of claim 1, wherein said actuatable drive comprises a shaft having a sleeve fixed thereon, said rotatable means is a further shaft, said lever is a rod secured in an opening through an end of said further shaft, and said flexible connection means is a spring loaded string wound around said sleeve and having its ends fastened to opposite ends of said rod.

References Cited by the Examiner
UNITED STATES PATENTS

| | | | |
|---|---|---|---|
| 2,000,046 | 5/1935 | Stevens | 346—114 X |
| 2,108,037 | 2/1938 | Au | 346—35 |
| 2,596,305 | 5/1952 | Stevens | 346—49 X |
| 3,233,245 | 1/1966 | Godby | 346—49 X |

RICHARD B. WILKINSON, *Primary Examiner.*

J. W. HARTARY, *Assistant Examiner.*